3,590,118
LONG LASTING INSECT REPELLENT FILMS FOR SKIN AND OTHER SUBSTRATES

James A. Conrady, Amherst, and Charles H. Stockman, Akron, Ohio, assignors to The B. F. Goodrich Company, New York, N.Y.
No Drawing. Filed Nov. 3, 1969, Ser. No. 873,513
Int. Cl. A61k 27/12
U.S. Cl. 424—19          7 Claims

ABSTRACT OF THE DISCLOSURE

Active chemical agents dissolve in interpolymer resins of alpha-beta olefinically unsaturated carbonyl monomers. The solutions are found to be slow release systems for the chemical agents when spread and dried as films on substrates. Coatings can be applied by spraying or spreading and are easily removable with a mildly alkaline solution such as soapy water, but resist elements such as rain, snow, perspiration and the like.

BACKGROUND OF THE INVENTION

Man is subject to extreme annoyance from insect bite. Chemical agents are known which repel these pests, but it is a problem to apply these agents to the skin in a manner or system so that they will be available to serve their purpose over a longer period of time. A liquid agent can be spread directly on to the skin, but the duration of its effectiveness is severely limited by the time in which it evaporates, is absorbed into the body, is rubbed off, or is washed off by perspiration, bathing or a rain shower. Liquid and solid agents may be applied to the skin in solution. Their effective life is usually limited by the time of evaporation of the carrier solvent and the other factors mentioned.

Mosquitoes and flies are an annoyance wherever and whenever the climate and water breeding conditions favor their propagation and life. Their bites are painful, irritating, and may be infectious. They transmit parasitic organisms which cause malaria, yellow fever and many other diseases. Despite attempts at its eradication the mosquito has continued to survive and even has developed resistance to many insecticides. Given the presence of a number of mosquitoes, the best hope of man and animal is to repel or ward off the pests. A mud pack is an effective barrier against the mosquito, but it is messy, difficult to keep in place on all exposed areas of the body, and soon dries out and falls away. Creams, salves or ointments can form barriers of some value, but are often greasy or chalky and then are unaesthetic.

Several chemicals are known which have a repellent effect on various members of the mosquito and fly families. The problem is how to apply said chemicals to the skin in a harmless manner and have them remain effective in repelling insects from the wearer for extended periods of time. Ideally a medium for active chemical agents will be found which can be readily applied on exposed skin areas, will quickly dry thereon to form a comfortable, thin, invisible or aesthetically acceptable film, will sustain release of the active chemical ingredient for a period of hours, will endure through the effects of rubbing contact of skin or clothing, and body perspiration, yet will be quickly removable at any desired time as by showering or bathing.

Oil of citronella has long been used to repel mosquitoes. Other repellents discovered later include dimethyl phthalate, dibutyl phthalate, ethylhexanediol, and indalene. In the early 1950's, N,N-diethyl-meta-toluamide, commonly called Deet and marketed under the trade name Metadelphene, was discovered to serve as a repellent and has been approved for use on human skin. More recently, U.S. Pat. 3,463,855 claims the N-(meta-toluyl)-methyl piperidines as insect repellents. N,N-diethyl-m-toluamide can be spread directly upon the human skin in its liquid form, but is sticky in that condition and is usually compounded with ethanol or isopropanol, for example, to form an aerosol spray or a liquid, or further with lanolin and cosmetic silicones to form a cream to be applied to the skin as a spray, liquid or cream and to form a not unpleasant film thereon. The best mosquito repellency life of such films that has been obtained is eight hours or so on unwashed areas in temperature climates and only a few minutes to an hour or so on an active person in hot, tropic areas where humidity is high and body perspiration is much greater than in temperate zones. A considerable portion of the repellent applied in these formulations is lost by absorption through the skin and by rubbing against clothing, furniture, etc. The repellent film produced by compositions of this invention is appreciably more resistant to loss by rubbing than is any insect repellent film previously known.

The particular insect repellent employed is not a critical part of this invention. Those named above have proved to be soluble in the acrylic resin terpolymers employed in the invention. In the examples N,N-diethyl-m-toluamide is most frequently used because it is the leading repellent on the market at this time.

SUMMARY OF THE INVENTION

A novel composition has been discovered which incorporates known insect repellent chemicals in a solution which is harmless to the skin of humans and animals and forms a unique film upon said skin. This film is thin, transparent, conforms to the skin and its movements and convolutions without cracking and, in addition to allowing the body skin layer to breathe and perspire naturally to maintain the normal level of body comfort, apparently provides an unexpected, slow delayed release of said repellent by diffusion to the environment of said film thereby creating an effective life of the insect repellent far greater than the effective life of an equal amount of said repellent alone. The repellent action outlasts that of the best known repellents and repellent compositions of the prior art and continues uninterrupted despite profuse body perspiration or even plain water wettings including the inadvertent wettings often encountered by those maneuvering in swampy or marshy waters or fording streams and other water courses or exposed to rain or the like. The repellency or protective effectiveness of the film lasts up to 24 hours on humans in temperate climates or until the coated skin areas are washed in an alkaline solution such as soapy water, or water made alkaline (to a pH of 7.5 or above) by the addition of ammonia, sodium triphosphate or other alkalizer, or until the active chemical ingredient has been volatilized to a point where decreasing air-skin interfacial amounts are less than the activity threshold.

The compositions of this invention comprise a known insect repellent and a thermoplastic alkaline water soluble terpolymer resin of alpha-beta olefinically unsaturated carbonyl monomers which dissolves the active chemical ingredient and forms a thin, water insolube film on the skin or other substrate when laid down thereon in the form of a solution, cream, lotion dispersion or spray from aqueous or alcoholic solutions. The preferred carrier is one of the alkyl alcohols such as ethanol, isopropanol, n-propanol or hexyldecyl alcohol although alkaline (pH 7.5–10.0) water may be used as well as mixtures of alcohols with or without water. A typical terpolymer of this type comprises in parts by weight 12 parts acrylic acid, 38 parts methyl methacrylate, and 50 parts ethyl acrylate. A film of this polymer is water insoluble until converted to the ammonium salt. These acrylic terpolymer resins are alkaline water soluble and may be deposted as films which dry on the skin and become water insoluble. Polyacrylate or natural gum thickeners or other materials used in cosmetic formulations may be added to increase the solution viscosities and even transform the solutions into viscous lotions or creams the consistency of face, skin and hand creams. The compositions containing active chemical ingredients are easily applied to the skin in any of these spray, solution or cream forms.

The preferred composition range of the materials of this invention is 1 part by weight of binder resin to 0.05 to 4.0 parts active chemical ingredient. The resins can be handled as 100% by weight liquid polymers or as 5% to 70% by weight solutions in water or a solvent such as ethanol. The combination of active chemical ingredient and resin as defined above is applicable to the skin, will remain on the skin over prolonged periods of time through water wettings and will continuously release the active chemical ingredient over a long period of time.

The water-soluble polymeric film-forming resins empolyed as a solvent for a matrix whereby the insect repellent is held for long term disbursement even under wet conditions are compositions comprising in 100 parts by weight of resin from 44 to 96 parts by weight of a lower acrylic acid ester, from 1 to 44 parts by weight of a methacrylic acid ester and from 3 to 12 parts by weight of an alpha-beta olefinically unsaturated carboxylic acid having a terminal $CH_2=C<$ group and having from 3 to 4 carbon atoms. They can be represented by the formula:

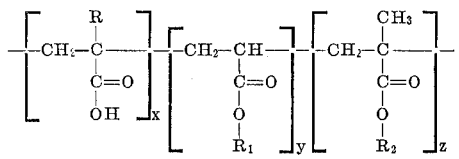

wherein R represents hydrogen and methyl, $R_1$ represents an alkyl radical having 1 to 10 carbon atoms such as methyl, ethyl, propyl and decyl, $R_2$ represents methyl and ethyl, $x$ represents from 3 to 12 weight percent based on the combined weight of $x$, $y$ and $z$; $y$ represents from 44 to 96 weight percent based on the combined weight of $x$, $y$ and $z$; $z$ represents from 1 to 44 weight percent based on the combined weights of $x$, $y$ and $z$; the sum of the numerical values of $x$ plus $y$ plus $z$ is always 100 and the groups $x$, $y$ and $z$ are present in the polymer in a heterogeneous relative order.

The lower acrylic acid esters useful in the resins used in this invention include those in which $R_1$ in the above formula is an aliphatic hydrocarbon group having from 1 to 10 carbon atoms such as methyl acrylate, ethyl acrylate, n-propyl acrylate, isopropyl acrylate, -ethylhexyl acrylate, n-butyl acrylate, isobutyl acrylate and secondary butyl acrylate. The most preferred lower acrylic acid esters are methyl acrylate and ethyl acrylate.

The lower methacrylic acid esters useful in this invention include those in which $R_2$ in the above formula is an aliphatic hydrocarbon group having from 1 to 2 carbon atoms such as methyl methacrylate and ethyl methacrylate. The preferred methacrylic acid ester is methyl methacrylate.

The alpha-beta olefinically unsaturated carboxylic acids embodied in this invention include acrylic acid and methacrylic acid.

The alkaline water-soluble thermoplastic terpolymers used in this invention are prepared by well-known polymerization techniques, e.g., bulk, solvent, and emulsion polymerization. Terpolymers of lower alkyl acrylates, lower alkyl methacrylates and acrylic or methacrylic acid are shown and described in United States Pats. 2,760,886, 2,790,735, 2,934,509, 3,454,509 and 3,460,945 among others. In especially useful embodiments, the polymers are prepared in solution polymerization. Monomers are dissolved in a reaction solvent, along with a peroxide catalyst. When the catalyst is dissolved, the reaction solution is preferably metered over a period of time into a reaction vessel equipped for reflux. Terpolymers are obtained as solutions, generally of about 60% total solids.

The acrylic resins prepared by the polymerization of these materials are insoluble in neutral or slightly acid (pH 6.0–7.0) water, soluble in alkaline water, and soluble in methanol, ethanol, isopropanol, acetone, alkyl acetates, and pyridine. They form thermoplastic, water insoluble films when spread on a substrate, and have a glass transition temperature above about 20° C.

The polymerization of these monomers is catalyzed by a free radical generating catalyst such as a peroxide or hydroperoxide. Hydrogen peroxide, benzoyl peroxide, caproic peroxide, tertiary butyl peroxide, caprylyl peroxide and cumene hydroperoxide are typical useful catalysts.

Solution polymerizations may be run in refluxing solvent such as ethylene glycol monoethyl ether, ethanol, benzene or toluene. The reactor is preferably purged with nitrogen to remove any traces of air or oxygen. Polymerization is conducted at the refluxing temperature of the solvent used. When the reaction is complete the product resin is dissolved in the solvent with a soldis content of about 50%–65%.

Similar terpolymers in water solution may be prepared by emulsion polymerization methods. Monomers are dispersed at room temperature in an aqueous solutions comprising an emulsifying agent such as sodium lauryl sulfate and adding a redox catalyst. Product polymers are generally 30% to 45% total solids solution.

Alternatively solvent polymerized polymers may be converted to water solutions by azeotropic distillation techniques known in the art. When spread on the skin or other substrate and dried, either a water or hydrocarbon solvent solution of the terpolymer forms clear, glossy water-insoluble (unless the water is alkaline) films.

These films adhere tenaciously and without cracking to metal, leather, paper, treated polyethylene and human skin tissues. The film at the same time is permeable and skin areas beneath it are able to breathe and perspire almost as though in direct contact with normal atmosphere. The film is not uncomfortable on the skin. The film so deposited endures until removed, a step easily accomplished completely and efficiently with use of dilute alkaline solutions, the most common of which is probably soapy water. The tenacity of the film to the skin is sufficient to resist the abrasion of clothing as the wearer moves about. This makes it practical to coat the entire body with, for example, the repellent composition of the invention upon arising, to dress in normal attire for the expected activities of the day and to have complete comfort and built-in mosquito repellency until a late day or evening shower or other alkaline bath is used to remove the repellent film—at which time a fresh repellent film may be quickly applied, again covering the entire body if desired, for night time hours.

DETAILED DESCRIPTION OF THE INVENTION

The following examples illustrate the invention. Parts are given as parts by weight.

Example I

A dropping funnel is charged with 10 parts glacial acrylic acid, 60 parts ethyl acrylate, 30 parts of methyl methacrylate, 100 parts isopropyl alcohol and 4 parts benzoyl peroxide. When the peroxide is dissolved in the monomer solution, the contents of the funnel are metered over one hour into a one liter flask equipped with a reflux condenser, stirrer and heating mantel. Reaction temperature is maintained at 95°–100° C. during the metering period. The reaction is held at 105° C. for 5 hours and then cooled to yield a solution containing 60% by weight of terpolymer. The solution of terpolymer is solvent dried in a vacuum drier. The dried terpolymer is then ready to use in either ammoniated water solutions or solvent solutions.

Thirty parts terpolymer is combined with thirty parts N,N-diethyl-m-toluamide and 70 parts water at pH 12. The mixture is stirred for 20 minutes and a clear, water white solution is formed.

Three adult rabbits are sheared to the skin in a strip two inches wide along the backbone. The sheared areas of the back, and the left, ear are then coated as follows:

Rabbit A. Uncoated, control
Rabbit B. N,N-diethyl-m-toluamide (liquid)
Rabbit C. N,N-diethyl - m - toluamide mixture (liquid) made as above.

The B and C animals are coated by painting the liquids on with a clean ¾ inch nylon bristle paint brush, dipped in the liquid and stroked on the area to be covered.

The rabbits are exposed 48 hours after the coatings are applied in cages to natural swarms of *Culex pipiens* mosquitoes in a swampy, mosquito infested area for one hour. Animals A and B are heavily bitten on both ears and the sheared back area. Animal C is less bothered and then only on the untreated right ear and untreated fur areas. No bites or landing contacts are recorded on the treated areas of animal C.

Example II

Two human volunteers are coated with the N,N-diethyl-m-toluamide alkaline water-soluble resin mixture of Example I at separate areas on the back and arms 6 and 10 hours before exposure to *Culex pipiens* mosquitoes. Uncoated areas are immediately heavily bitten upon exposure, but coated areas receive no bites for up to one hour of exposure.

Example III

One leg of a human volunteer is coated with the diethyl-m-toluamide alkaline water-soluble resin mixture of Example I and kept shielded by a trouser leg for 22 hours before exposure. After exposure to a swarm of *Culex pipiens* mosquitoes, the untreated leg is heavily bitten in less than 5 minutes. Mosquitoes approach the treated leg but do not settle to feed except for an suspected bite on the knee.

Example IV

A mixture of 30 parts N,N-diethyl-m-toluamide, 15 parts solids alkaline water-soluble resin of Example I in 30% water solution and 100 parts ethanol is prepared by stirring with an electric mixer in a 500 ml. beaker for 5 minutes. The mixture is applied by hand dipping and spreading to the arms and legs of a human volunteer at 9:00 a.m. The solution dries completely on the skin in about three minutes forming a transparent film. A slight odor of the N,N-diethyl-m-toluaminde is detectable. During the afternoon of the same day the volunteer plays tennis for 3 hours and perspires profusely (temperature is above 80° F.). At 5:00 p.m. the odor of N,N'-diethyl-m-toluamide is still detectable.

At 10:00 p.m. the volunteer accompanied by two other humans enters a mosquito infested area. The treated volunteer receives no bites; the untreated humans are forced to leave the area because of mosquito attacks. At 11:00 p.m. the volunteer takes a soap and water shower and there is then no detectable odor of N,N-diethyl-m-toluamide on his person.

Example V

Solutions are prepared and evaluated in a time of protection test against mosquitoes as follows: A ml. of the repellent mixture is spread evenly over the forearm of a volunteer subject. The treated arm is exposed to caged *Aedes aegypti* mosquitoes for periods of 3 minutes at 30 minute intervals. Effectiveness is based on complete protection, determined as the time between the treatment and the first confirmed bite. A confirmed bite is a bite followed by another bite within 30 minutes.

The results are tabulated as follows:

| | Parts | | | Protection time, minutes |
|---|---|---|---|---|
| | Active chemical [1] | Ethanol | Resin from Example I | |
| Mixture: | | | | |
| A (control) | 50 | 50 | | 270 |
| B | 50 | 35.7 | 14.3 | 406 |
| C | 50 | 34.1 | 15.9 | 450 |

[1] N,N-diethyl-m-toluamide.

The formulations of the invention, B and C, almost doubled the protection time offered by the control formulation, all formulations containing the same proportion of active chemical ingredient. The slow release of the active ingredient is unexpected. The large increase in protection time makes materials B and C superior to control A.

Example VI

A wiping test is used to evaluate mixtures similar to those of Example V as follows:

A folded paper wiping tissue (paper toweling) is placed around the treated arm above the elbow. An elastic band placed over the tissue holds it close to the skin. As the tissue is pulled down and up over the treated spot on the forearm the movement is counted as a single wipe. Tissue is changed after five wipes. Ten minutes after the arm is treated as in Example V, the arm is wiped and then tested in the mosquito cage for 3 minutes. If a confirmed bite is not received, the wiping and testing is continued.

| | Parts | | | | Number of wipes |
|---|---|---|---|---|---|
| | Active ingredient [1] | Ethanol | Resin from Example I | Ammonium hydroxide | |
| Mixture: | | | | | |
| A (control) | 50 | 50 | | | 23+ |
| B | 50 | 36.3 | 13.7 | | 51+ |
| C | 50 | 35.0 | 7.0 | 8.0 | 48+ |

[1] N,N-diethyl-m-toluamide.

All formulations contain the same proportion by weight of active chemical ingredient. Formulations B and C, illustrative of the invention, resist over twice the number of wipes that control formulation A can withstand. This indicates greatly increased resistance to rub off by clothing or brushing against some object while wearing the repellent film.

Example VII

A formulation is made comprising:

| Material: | Parts |
|---|---|
| N,N-diethyl-m-toluamide | 50 |
| Terpolymer Low molecular weight resin (Ex. I) | 17.5 |
| Ethanol | 32.5 |

In a first test the formulation is spread on the arm of a volunteer over a 10-square inch patch at the rate of 15 mg./in.$_2$ of N,N-diethyl-m-toluamide. A control patch of N,N-diethyl-m-toluamide (100%) at the rate of 30 mg./in.$_2$ is spread on the other arm. Arms are encased in plastic shields and the hands in a rubber glove. Only the test section of each forearm is exposed. The forearm is inserted into a 1 cubic foot cage containing at least 100 avid female *Aedes aegypti* mosquitoes 4–8 days old. The test is made at 30 minute intervals for 3 minutes at a time until 2 bites are received in 3 minutes for a confirmed bite.

|   | Hours |
|---|---|
| Effectiveness of control | 8 |
| Effectiveness of test sample at ½ the active strength of the control | 15 |

In another test the resistance to washing is evaluated by preparing test patches in the forarms of volunteers as above except that the strength of the test sample is 15.0 mg./in.$_2$ of N,N-diethyl-m-toluamide and the strength of the control is 20 mg./in.$_2$ of N,N-diethyl-m-toluamide. One hour after application the arm is rinsed by a stream of 500 cc. of 500 cc. of water applied from a height of 3″ from an opened separatory funnel. The water is at 26° C., and is flowed over the entire ten square inch test area by oscillation of the funnel. After a wash a 15 minute air-dry time is allowed and the arm is then tested for repellency in the mosquito cage. Two bites in three minutes is a confirmed bite. Each time the repellency test is passed, another wash, dry and test cycle is repeated.

With an unwashed arm:

control failed at 24 hours,
test repellent passed at 24 hours

With the washed arm:

control failed after 3rd wash,
test repellent still effective after 24 washes.

After 24 washes the test arm is washed with soap and water and air dried for 15 minutes. It then fails the first repellency test.

We claim:

1. Film forming comfortable, skin conforming, rub-resistant, harmless, thin, invisible, aesthetic, area transparent, water-insoluble, alkaline-water soluble compositions of thermoplastic resins of the formula

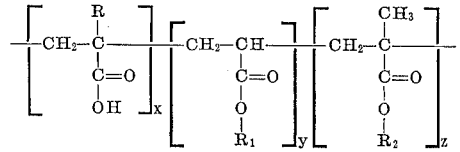

wherein R represents hydrogen and methyl, $R_1$ represents an alkyl radical having 1 to 10 carbon atoms, $R_2$ represents methyl and ethyl, the sum of $x$, $y$ and $z$ is always 100 and groups $x$, $y$ and $z$ are present in a heterogeneous relative order and wherein one part of said resin is combined and dissolved with 0.05 to 4.0 parts of an active volatile insect repelling chemical ingredient effective for use on human skin, wherein said water-soluble resin in dry film form when laid down on the skin from aqueous or alkyl alcohol solution, cream, lotion, dispersion, or spray carrier, conforms to the skin and its movements and convolutions without cracking, allows the body skin layer to breathe naturally and perspire naturally and, despite profuse body perspiration or water wettings holds said active ingredient and slowly diffuses or releases said ingredient to the environment over a long period of time and at least until (a) the coated skin areas are washed in alkaline solution, or (b) until the active insect-repellent chemical ingredient has been volatilized to less than the activity threshold.

2. Film forming compositions of claim 1 wherein $x$ represents acrylic acid, $y$ represents ethyl acrylate and $z$ represents methyl methacrylate.

3. A method for repelling insects from the atmosphere slowly over a long period of time comprising preparing a mixture in accordance with claim 1 of an insect repelling volatile chemical ingredient in a thermoplastic resin of the formula

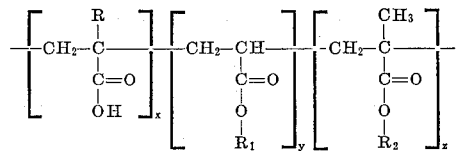

wherein R represents hydrogen and methyl, $R_1$ represents an alkyl radical having 1 to 10 carbon atoms, $R_2$ represents methyl and ethyl, the sum of $x$, $y$ and $z$ is always 100 and groups $x$, $y$ and $z$ are present in a heterogeneous relative order, said insect repelling volatile chemical ingredient being dissolved in said resin and released therefrom to the atmosphere slowly over a long period of time.

4. A long-lasting insect repellent composition comprising a mixture of 1 part of a thermoplastic polymeric resin of alpha-beta olefinically unsaturated carboxyl monomers of claim 1 and of 0.05 to 4.0 parts of an insect-repellent volatile chemical soluble in said polymer.

5. A long lasting mosquito repellent composition comprising 1 part of a thermoplastic polyacrylic resin of claim 1, 0.05–4.0 parts of N,N-diethyl-m-toluamide and 0 to 5 parts of an alcohol selected from the group consisting of ethanol, n-propanol, hexyldecyl alcohol and isopropanol.

6. A method for repelling mosquitoes from the skin and other body surfaces comprising preparing a mixture of 1 part of thermoplastic resin of claim 1, 0.05–4.0 parts N,N-diethyl-m-toluamide, and 0 to 5 parts of an alcohol selected from the group consisting of ethanol, hexyldecyl alcohol and isopropanol by stirring said elements together for about 10 to 30 minutes and apply said mixture to the skin and other body surfaces from which it is desired to repel mosquitoes.

7. A method for production of insect repellent skin or other body substrates coated with films insoluble in water and removable by mildly alkaline solutions which comprises dissolving in 1 weight part of thermoplastic, alkaline-water soluble acrylic resin of claim 1 from 0.05 to 4.0 parts of a chemically active insect repellent volatile agent and spraying or spreading the said solution on skin or other body substrate.

References Cited

UNITED STATES PATENTS

| | | | |
|---|---|---|---|
| 2,624,690 | 1/1953 | Leader | 424—81 |
| 2,804,073 | 8/1957 | Gallienne et al. | 128—156 |
| 2,870,129 | 1/1959 | Merriam | 260—86.1 |
| 3,005,747 | 10/1961 | Jacob et al. | 424—78 |
| 3,400,093 | 9/1968 | Feinberg | 260—29.6 |

OTHER REFERENCES

Ihndris, R. W., et al., "Effect of Promising Insect Repellents on Plastics and Paints," U.S. Dept. of Agr., Agr. Research Service, Entomology Research Branch ARS-33-7, 27 pp. (1955).

Chem. Abstracts 49:16318h (1955).

SHEP K. ROSE, Primary Examiner

U.S. Cl. X.R.

106—15; 117—138.5, 161, 128.4, 132, 138.8 142, 155;
119—156, 157, 158; 128—156, 260; 239—6, 34, 36, 60;
260—29.6, 80.5; 424—27, 29, 33, 47, 78, 81, 324